UNITED STATES PATENT OFFICE 2,689,243

TRISAZO DYESTUFFS

Walter Hanhart, Riehen, Switzerland, assignor to Ciba Limited, Basel, Switzerland No Drawing. Application October 4, 1951, Serial No. 249,810

Claims priority, application Switzerland November 2, 1950

9 Claims. (Cl. 260—173)

The present invention relates to the manufacture of new dyestuffs of the type of the product of the formula (1)
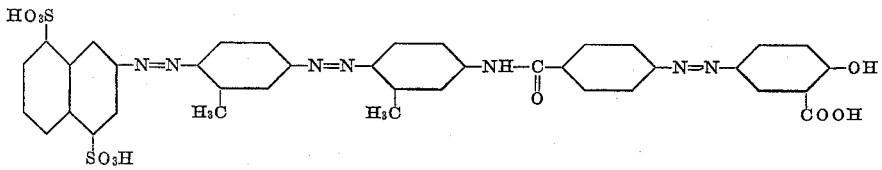

The products of the present invention correspond to the general formula (2)
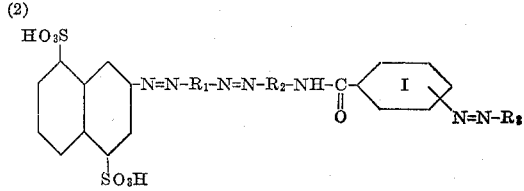

in which $R_1$ and $R_2$ each indicates the radical of a middle component of the benzene series and $R_3$ the radical of a hydroxy benzene-o-carboxylic acid which is capable of coupling, and in the benzene nucleus I the two ring carbon atoms attached to the —CO— and the —N=N— group are separated from one another by at least one further ring carbon atom.

These trisazo dyestuffs are produced according to the invention by coupling, with hydroxybenzene-o-carboxylic acids which are capable of coupling, diazo compounds of aminodisazo dyestuffs which correspond to the general formula (3)
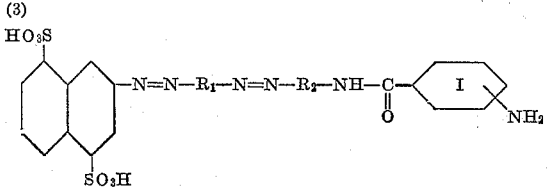

in which the various symbols have the same significance as in the Formula 2.

Such aminodisazo dyestuffs may be prepared by coupling diazotized 2-aminonaphthalene-4:8-disulfonic acid with a middle component of the benzene series (H—$R_1$—$NH_2$) capable of coupling, rediazotizing the aminomonoazo dyestuff and coupling again the diazo compound with a middle component of the benzene series (H—$R_2$—$NH_2$) capable of coupling, acylating the so obtained product with meta- or para-nitro-benzoyl chloride and reducing the nitro group into the amino group.

As starting materials which contain the radical of the first middle component, viz. the radical $R_1$ compounds are concerned such as: aniline, 1-amino-2-methyl- or 2-methoxybenzene (suitably coupled in the form of the ω-methane sulfonic acid), 1 - amino - 3 - methylbenzene, 1-amino-3-methoxybenzene, 1-amino-2-methoxy-5-methylbenzene, 1-amino-2-ethoxy-5-methylbenzene or 1-amino-2-methoxy-5-acetylaminobenzene.

The above specified middle components of the benzene series can also serve as second middle components (corresponding in the formula to H—$R_2$—$NH_2$).

As examples of the hydroxybenzene-o-carboxylic acids which are capable of coupling and which likewise serve as starting materials in the present process, there may be mentioned: 5- or 6-methyl - 1 - hydroxybenzene-2-carboxylic acid, 6-chloro-1-hydroxybenzene-2-carboxylic acid and especially 1-hydroxybenzene-2-carboxylic acid.

The diazotization of the amino disazo dyestuffs of the Formula 3 can be carried out according to customary methods known per se, for example with the aid of hydrochloric acid and sodium nitrite. The diazodisazo compounds thus obtainable are then coupled, advantageously in an alkaline medium, if desired with the addition of agents promoting coupling such as pyridine, with the o-hydroxycarboxylic acids.

The new dyestuffs thus obtainable, which correspond to the Formula 2 set forth above and which, as is seen from the above statements, contain as solubilizing groups two sulfonic acid groups and advantageously only the single carboxylic acid group present in the end component, are suitable for the dyeing of a wide variety of materials, for example, animal fibers such as wool, silk and leather, but especially for the dyeing and printing of cellulosic materials such as cotton, linen, artificial silk and staple fiber from regenerated cellulose. The dyestuffs can with advantage be treated on the fiber or partly on the fiber and partly in the dyebath, with agents providing metal and according to the generally known processes. Advantageously, for example, the process of U. S. Patent No. 2,148,659 can be used, according to which in the same bath first dyeing and then treatment with agents providing metal is carried out. As agents providing metal there are preferably concerned in this case such as are staple to alkaline solutions, such as complex copper tartrates.

In many cases especially valuable dyeings are obtained when the process is used according to which the dyeings or printings produced with the metal-free dyestuffs are after-treated with such aqueous solutions as contain basic formaldehyde condensation products of compounds which contain in the molecule at least once the atom grouping

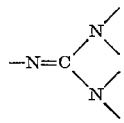

for example dicyandiamide and dicyandiamidine, or which can easily be converted into such compounds, as for example cyanamide, and water-soluble, especially complex, copper compounds. Such processes are described for example in British Patent No. 619,969.

The direct dyeings obtainable on cellulosic fibers with the new trisazo dyestuffs are as a rule distinguished by very good fastness to light. The coppered dyeings exhibit in addition a likewise very good fastness to light and a good fastness to washing and perspiration.

The following examples illustrate the invention, the parts and percentages being by weight, unless otherwise stated, and the relation between part by weight and part by volume being the same as that between the kilogram and liter:

*Example 1*

63.2 parts of the disodium salt of the dyestuff of the formula

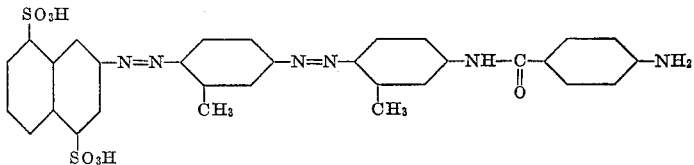

are dissolved in 1000 parts of warm water. To the solution, cooled to room temperature, so much ice is added that the temperature falls to 5° C., then 7 parts of sodium nitrite in the form of a 10 per cent. solution and thereupon, with good stirring and all at once, 240 parts of 6 per cent. hydrochloric acid. Stirring is carried out for some time with ice cooling followed by coupling with a solution of 15.2 parts of 1-hydroxybenzene-2-carboxylic acid rendered alkaline with sodium carbonate. Stirring is continued with cooling until diazo compound can no longer be detected. The dyestuff formed is completely precipitated: it is filtered off. In order to obtain it in a more easily filterable form, the coupling mixture can first be warmed, whereupon 5 to 10 parts of sodium chloride are added per 100 parts by volume of coupling mixture. The dried dyestuff forms an orange brown powder which dissolves in concentrated sulfuric acid with a violet blue and in water with an orange coloration. On cotton yellow orange dyeings which are fast to light and easily dischargeable are obtained. By after-coppering in the same or in a fresh bath, the dyeing becomes somewhat stronger but changes only slightly in color shade. It is likewise of good fastness to light and good dischargeability and in addition is of good fastness to washing.

*Example 2*

72.2 parts of the disodium salt of the dyestuff of the formula

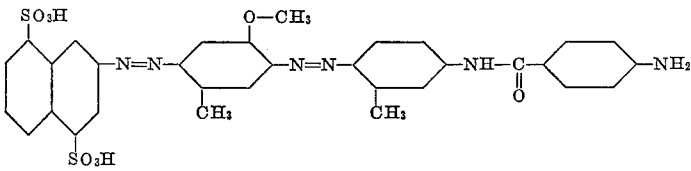

are dissolved in 2000 parts of hot water. After cooling to about 50° C. so much ice is added that the temperature falls to 5 to 10° C. and then 7 parts of sodium nitrite in the form of a 10 per cent. solution. With good stirring 240 parts of 6 per cent. hydrochloric acid are added all at once. Stirring is continued for some time with cooling and then coupling is carried out with a solution of 15.2 parts of 1-hydroxybenzene-2-carboxylic acid rendered alkaline with sodium carbonate. In order to accelerate the coupling about 10 parts of pyridine can be added per 100 parts of coupling mixture. When the coupling is complete, if desired after the pyridine has been distilled off, and after the addition of some sodium chloride, the dyestuff is filtered off and dried. A red dyestuff powder is obtained which dissolves in concentrated sulfuric acid with a blackish blue and in water with an orange coloration and which dyes cotton in orange shades which are fast to light. The coppered dyeings possess a good fastness to washing.

In the following table further valuable trisazo dyestuffs are set out, which are obtained when the aminomonoazo dyestuff produced from diazotized 2-aminonaphthalene-4:8-disulfonic acid and the amine in column I, is diazotized and coupled with the amine in column II, the aminodisazo dyestuff thus obtained is condensed with the nitrobenzoyl chloride specified in column III, the nitro group reduced to the amino group and the amino compound produced diazotized and coupled with the hydroxybenzene-o-carboxylic acid set forth in column IV.

| | I | II | III | IV | Color of Solution in concentrated sulfuric acid | Shade of the coppered dyeing on cotton |
|---|---|---|---|---|---|---|
| 1 | 1-amino-3-methyl-benzene. | 1-amino-3-methyl-benzene. | m-nitro-benzoyl chloride. | 1-hydroxybenzene 2-carboxylic acid. | blue violet | yellow orange. |
| 2 | ___do___ | 1-amino-2-methoxy-5-methylbenzene. | p-nitrobenzoyl chloride | ___do___ | blue | orange. |
| 3 | 1-amino-2-methoxy-5-methylbenzene. | 1-amino-3-methyl-benzene. | ___do___ | 6-chloro-1-hydroxy-benzene-2-carboxylic acid. | violet | red orange. |
| 4 | aminobenzene | 1-amino-2-methoxy-5-methylbenzene. | ___do___ | 1-hydroxybenzene-2-carboxylic acid. | blue violet | orange. |
| 5 | ___do___ | ___do___ | ___do___ | 6-chloro-1-hydroxy-benzene-2-carboxylic acid. | ___do___ | Do. |
| 6 | ___do___ | ___do___ | ___do___ | 5-methyl-1-hydroxy-benzene-2-carboxylic acid. | ___do___ | Do. |
| 7 | 1-amino-3-methyl-benzene. | 1-amino-2:5-dimethyl-benzene. | ___do___ | 1-hydroxybenzene-2-carboxylic acid. | violet | yellow orange. |
| 8 | ___do___ | 1-amino-3-methoxy-benzene. | ___do___ | ___do___ | blue | orange. |
| 9 | ___do___ | 1-amino-2-methoxy-5-acetylamino-benzene. | ___do___ | ___do___ | blackish blue | brick red. |

*Example 3*

100 parts of cotton are entered into a dyebath which contains in 4000 parts of water 1.25 parts of the dyestuff obtainable according to Example 2 and 2 parts of anhydrous sodium carbonate, at a temperature of 50° C. and this is raised in the course of 20 minutes to 90–95° C., 40 parts of crystalline sodium sulfate are added and dyeing is carried out for 30 minutes at 90–100° C. The direct dyeing thus obtained is orange and is already distinguished by a surprisingly good fastness to light. For improvement of the fastness to washing, it can be after-coppered in the same bath in the following manner:

The dyebath is allowed to cool to about 70° C., 3 parts of complex sodium copper tartrate of approximately neutral reaction are added, coppering is carried out for ½ hour at about 80° C. and the dyeing is then rinsed with cold water. If desired the dyeing can be soaped by after-treatment with a solution which contains 5 parts of soap and 2 parts of anhydrous sodium carbonate in 1000 parts by volume of water.

An orange dyeing (only slightly changed in color shade compared with the uncoppered dyeing) of good fastness to washing and light is obtained.

What is claimed is:

1. A trisazo dyestuff containing two sulfonic acid groups and corresponding to the formula

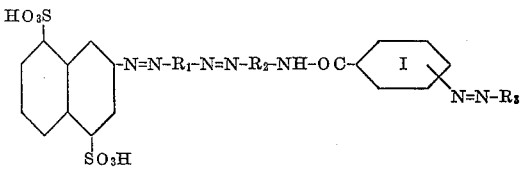

in which $R_1$ and $R_2$ each stands for the radical of a middle component of the benzene series, $R_3$ stands for the radical of a 1-hydroxybenzene-2-carboxylic acid bound to the azo group in its 4-position, and in the benzene nucleus I the two ring carbon atoms attached to the —CO— and the —N=N— group are separated from one another by at least one further ring carbon atom.

2. A trisazo dyestuff containing a single carboxylic acid group and two sulfonic acid groups and corresponding to the formula

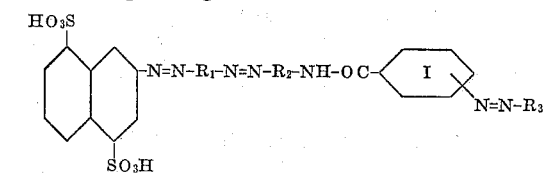

in which $R_1$ and $R_2$ each stands for the radical of a middle component of the benzene series, $R_3$ stands for the radical of a 1-hydroxybenzene-2-carboxylic acid bound to the azo group in its 4-position, and in the benzene nucleus I the two ring carbon atoms attached to the —CO— and the —N=N— group are separated from one another by at least one further ring carbon atom.

3. A trisazo dyestuff containing a single carboxylic acid group and two sulfonic acid groups and corresponding to the formula

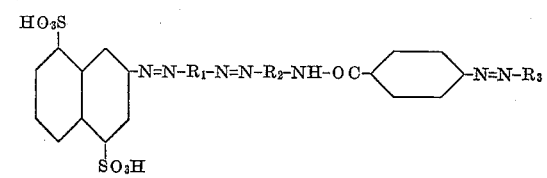

in which $R_1$ and $R_2$ each stands for the radical of a middle component of the benzene series and $R_3$ stands for the radical of a 1-hydroxybenzene-2-carboxylic acid bound to the azo group in its 4-position.

4. A trisazo dyestuff containing a single carboxylic acid group and two sulfonic acid groups and corresponding to the formula

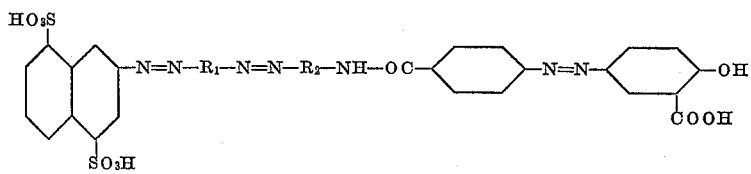

in which $R_1$ and $R_2$ each stands for the radical of a middle component of the benzene series.

5. The trisazo dyestuff of the formula
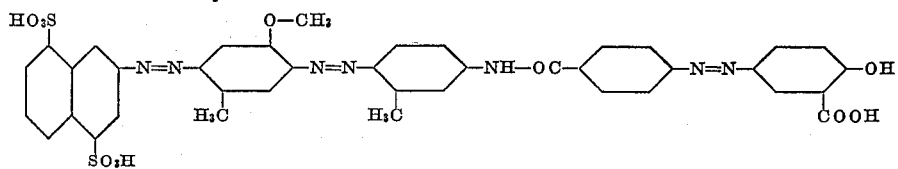
6. The trisazo dyestuff of the formula
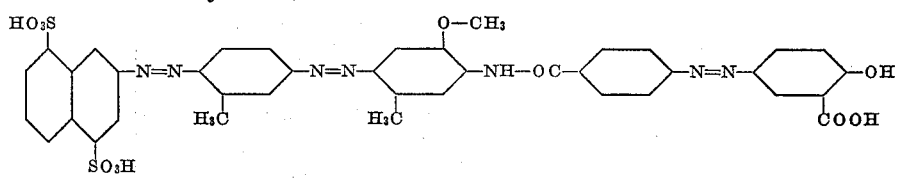
7. The trisazo dyestuff of the formula
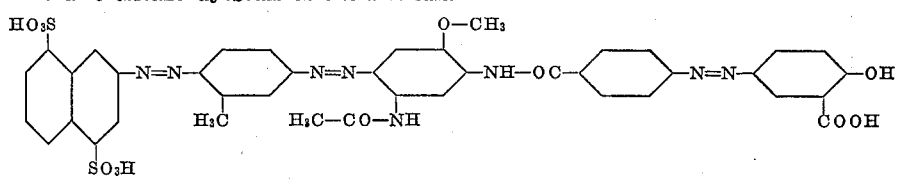
8. The trisazo dyestuff of the formula
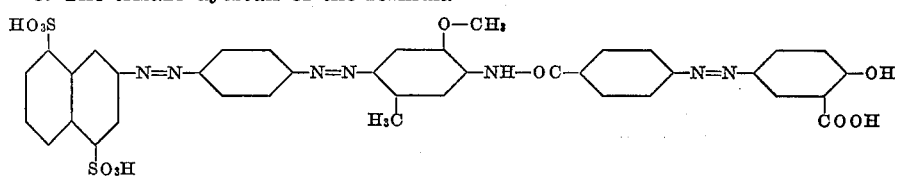
9. The trisazo dyestuff of the formula
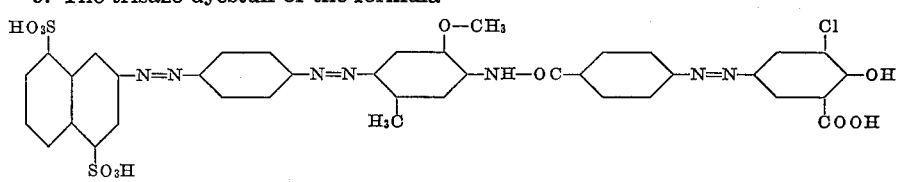
References Cited in the file of this patent
UNITED STATES PATENTS
| Number | Name | Date |
|---|---|---|
| 1,904,820 | Brightman | Apr. 18, 1933 |
| 2,169,152 | Kaiser | Aug. 8, 1939 |